United States Patent
Johanson et al.

(10) Patent No.: US 9,550,472 B2
(45) Date of Patent: Jan. 24, 2017

(54) DEVICE FOR CREATING GAS INFLATING AN AIRBAG

(71) Applicants: Mats Johanson, Fristad (SE); David Sturk, Göteborg (SE)

(72) Inventors: Mats Johanson, Fristad (SE); David Sturk, Göteborg (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 213 days.

(21) Appl. No.: 13/967,698

(22) Filed: Aug. 15, 2013

(65) Prior Publication Data

US 2014/0048422 A1    Feb. 20, 2014

(30) Foreign Application Priority Data

Aug. 16, 2012   (SE) ...................................... 1250926

(51) Int. Cl.
*B60R 21/264*   (2006.01)
*B60R 21/38*    (2011.01)
*B60R 22/195*   (2006.01)

(52) U.S. Cl.
CPC .............. *B60R 21/264* (2013.01); *B60R 21/38* (2013.01); *B60R 22/1954* (2013.01)

(58) Field of Classification Search
CPC   C25B 1/02–1/12; B60R 21/264; B60R 21/38; B60R 22/1954
See application file for complete search history.

(56) References Cited

U.S. PATENT DOCUMENTS

| | | | |
|---|---|---|---|
| 5,580,086 A * | 12/1996 | McAlister ..................... 280/737 |
| 2010/0247980 A1* | 9/2010 | Jang ........................ H01M 2/34 429/10 |
| 2011/0086243 A1* | 4/2011 | Bae ...................... H01M 2/1022 429/7 |
| 2011/0111294 A1* | 5/2011 | Lopez ................... H01M 4/134 429/217 |
| 2012/0070706 A1* | 3/2012 | Miyazaki ................ B60L 1/003 429/61 |

* cited by examiner

*Primary Examiner* — Ciel Thomas
(74) *Attorney, Agent, or Firm* — Stephen T. Olson; Harness, Dickey & Pierce, P.L.C.

(57) ABSTRACT

A personal protection arrangement in a vehicle includes a gas generator for fluid communication with a reservoir and a control unit. The control unit is arranged to activate the gas generator upon fulfillment of at least one predetermined criterion such that gas is released by the gas generator into the reservoir and the pressure in the reservoir is increased. The gas generator comprises at least one electrochemical cell which is arranged to generate gas when the electrical status of the electrochemical cell is changed from a first state to a second state by a state-changing action.

18 Claims, 6 Drawing Sheets

DEVICE FOR CREATING GAS INFLATING AN AIRBAG

CROSS-REFERENCE TO RELATED APPLICATIONS

This application claims the benefit and priority of Swedish Application No. 1250926.1 filed 16 Aug. 2012. The entire disclosure(s) of (each of) the above application(s) is (are) incorporated herein by reference.

FIELD

The present disclosure relates to a device for creating gas inflating an airbag.

BACKGROUND

This section provides background information related to the present disclosure which is not necessarily prior art.

The present invention relates to a personal protection arrangement in a vehicle. The personal protection arrangement comprises a gas generator for fluid communication with a reservoir. The personal protection arrangement also comprises a control unit arranged to activate the gas generator upon fulfillment of at least one predetermined criterion such that gas is released by the gas generator into the reservoir and the pressure in the reservoir is increased.

SUMMARY

This section provides a general summary of the disclosure, and is not a comprehensive disclosure of its full scope or all of its features.

The present invention also relates to a method for activating a gas generator upon fulfillment of at least one predetermined criterion such that gas is released by the gas generator into a reservoir and the pressure in the reservoir is increased.

Most modern cars are equipped with at least one airbag unit, each airbag unit being in connection with a gas generator. In the case of a collision, a collision sensor is arranged to activate the gas generator which then rapidly fills the airbag with gas such that it is inflated. Normally, a gas generator comprises gun powder or other similar highly explosive and flammable compound as propellant, which is ignited when the gas generator is activated. The rate of gas generation is dependent on the pressure in the gas generator, therefore the housing is made of steel and its shape is cylindrical.

There is a number of problems related to the gas generators that are used today, which will be discussed below.

Airbags with gas generators are normally considered as dangerous goods, so handling and transportation must be under certain regulations; accidently triggering an inflator may cause injury. Deactivation of airbags is done individually and may require hands-on by qualified personnel. At the end of life of a vehicle, the safe dismantling and handling of existing airbags with gas generators is also a dangerous process.

As mentioned above, the designs of conventional gas generators are limited to cylindrical shapes. Moreover, their designs are often limited to specific applications for each type of inflator. Large airbags, for example for a three seat row, may demand for very large gas generators in order to generate an even inflation distribution. This leads to problems regarding weight and size.

The same problems are evident for other safety details of a vehicle that are propelled by gas generators, such as seat belt pre-tensioners and hood lifting devices.

There is thus a need for a new type of gas generator that is safer to handle, and with less restrictions regarding design and shape.

The object of the present invention is to provide a gas generator according to the above. This object is achieved by means of a personal protection arrangement in a vehicle. The personal protection arrangement comprises a gas generator for fluid communication with a reservoir. The personal protection arrangement also comprises a control unit arranged to activate the gas generator upon fulfillment of at least one predetermined criterion such that gas is released by the gas generator into the reservoir and the pressure in the reservoir is increased. The gas generator comprises at least one electrochemical cell which is arranged to generate gas when the electrical status of said electrochemical cell is changed from a first state to a second state by means of a state-changing action.

This object is also achieved by means of a method for activating a gas generator upon fulfillment of at least one predetermined criterion such that gas is released by the gas generator into a reservoir and the pressure in the reservoir is increased. The method comprises the step of changing the electrical status of at least one electrochemical cell used by the gas generator from a first state to a second state by means of a state-changing action.

According to an example, the first state is a charged state and the second state is an at least partially discharged state, where the state-changing action is constituted by a discharge of said electrochemical cell. The discharge is preferably in the form of an at least partial short circuit.

According to another example, the first state is a discharged state and the second state is a charged state. The state-changing action is constituted by a charging voltage pulse that is placed on electrical connections which are in electrical contact with said electrochemical cell.

In this case, the charging voltage pulse may be provided by a battery already existing in the vehicle. The battery may be in the form of a starting battery or a traction battery.

According to another example, the personal protection arrangement may comprise an airbag unit, and the reservoir may be constituted by at least one airbag.

According to another example, each electrochemical cell may comprise a compound with ionic transport properties that generate heat and gas when submitted to a state-changing action.

Other examples are disclosed in the dependent claims.

A number of advantages are provided by means of the present invention. For example:

A gas generator without any electrical charge it is not dangerous and can be handled as a standard component.

A vehicle electronic control unit (ECU) can evaluate the operational state and present inflation performance of the gas generator whenever required during its complete lifetime.

Unintended triggering can be avoided by deactivating the gas generator electronically.

These gas generators are possible to re-cycle.

These gas generators have an adaptive geometry that may be formed to fit many special airbag unit configurations such that weight and space added by the airbag units are reduced.

The rate, as well as the duration of the gas generation, can be controlled.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
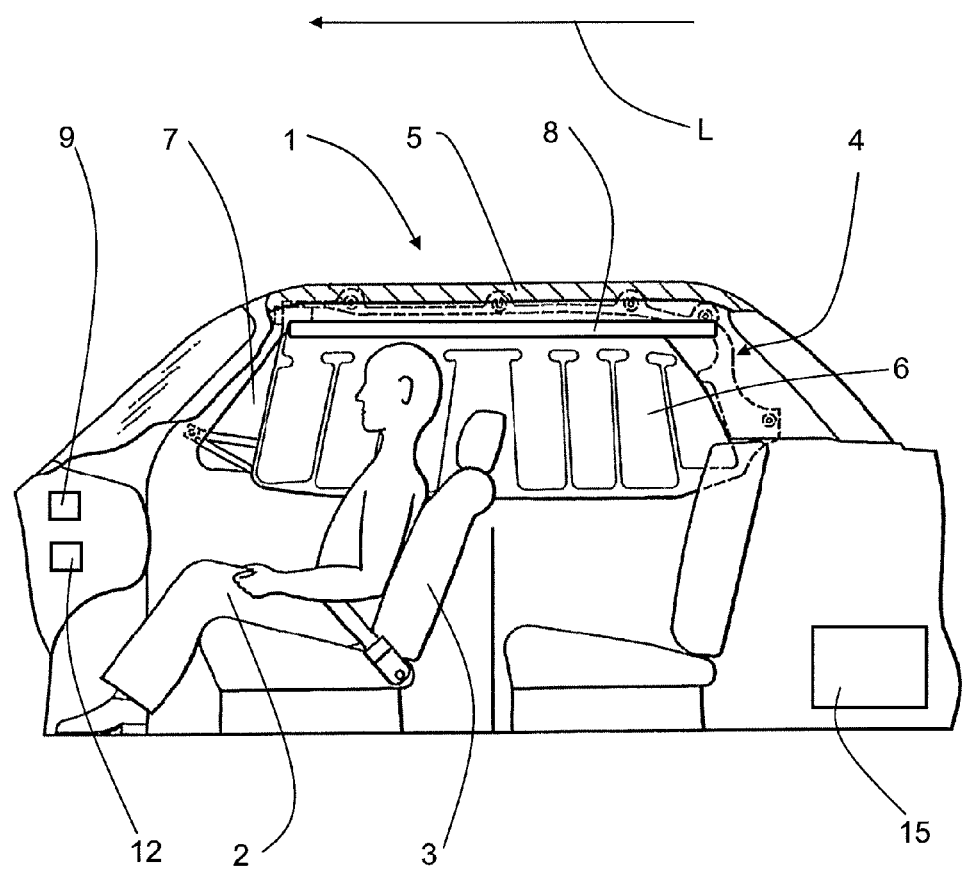
FIG. 1 shows a schematic cut-open side view of a part of a vehicle.

FIG. 1 shows a schematically cut-open side view of a part of a vehicle 1, where a person 2 driving the vehicle 1 is positioned in the front seat 3. The vehicle 1 has a vehicle longitudinal extension L in its normal forward running direction, and a first type of airbag unit 4 installed along a side of the vehicle's roof 5. The airbag unit 4 mainly extends parallel to the vehicle longitudinal extension L. The airbag unit 4, here shown inflated, comprises an airbag 6 that is intended to provide side impact protection as a curtain that at least partly covers the side windows 7. This airbag 6 may be referred to as a curtain airbag.

The airbag unit 4 also comprises a gas generator 8 that has been activated by a control unit 12 prior to the inflation of the airbag 6, which control unit 12 is connected to receive input from a collision detector 9. The control unit 12 and collision detector 9 are only schematically indicated in FIG. 1, being components of a previously known kind.

Figure 2:
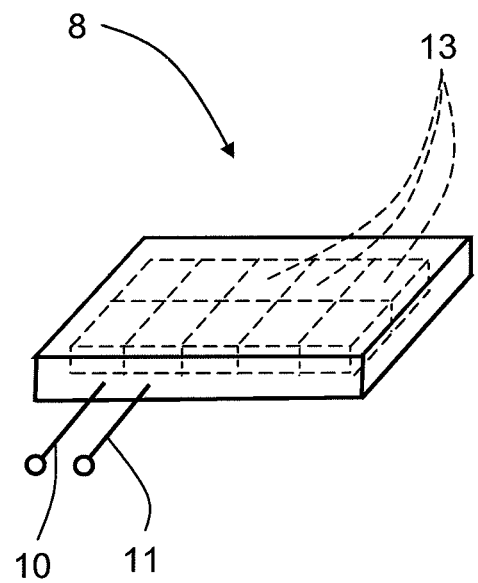
FIG. 2 shows a schematic perspective view of a gas generator according to the present invention.

FIG. 2 shows a schematic perspective view of a gas generator 8. According to the present invention, the gas generator 8 comprises a plurality of electrochemical cells 13 (only a few are indicated in FIG. 2 for reasons of clarity). Please note that the electrochemical cells 13 may be of different types with different shapes and designs, and that the number of electrochemical cells 13 may vary. The electrochemical cells 13 are only schematically indicated in FIG. 2.

The electrochemical cells 13 are arranged to generate gas when the electrical status of the electrochemical cells 13 is changed from a first state to a second state by means of a state-changing action. The gas generator 8 comprises electrical connections 10, 11.

The arrangement according to FIG. 1 will be discussed later together with some other examples of airbag units where the present invention may be used.

In the following, the term gas generator refers to an electrochemical gas generator.

Figure 3:
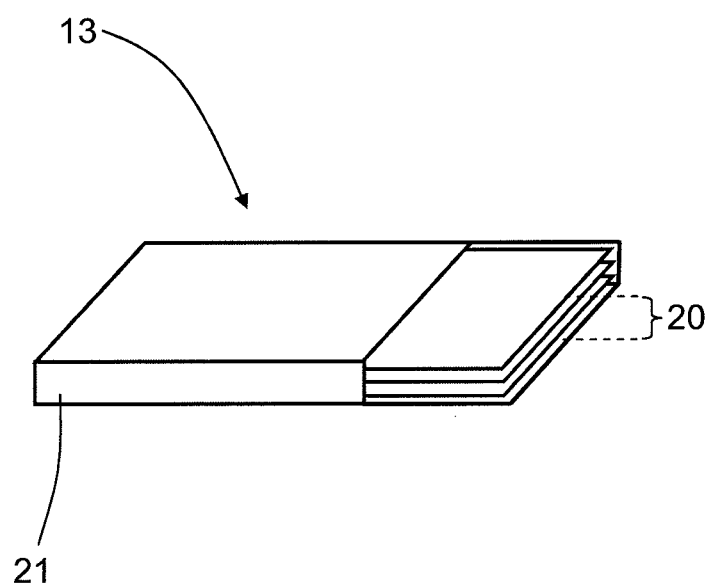
FIG. 3 shows a schematic partially cut-open perspective view of an electrochemical cell.

FIG. 3 shows a schematic partially cut-open perspective view of an example of an electrochemical cell 13. The electrochemical cell 13 is constituted of a sandwich structure 20 comprising layered electrochemically active sheets in a casing 21 in a previously known manner. Each sheet comprises a positive and a negative active material and separator, i.e. a membrane, which is filled with electrolyte. For example, the thickness of each sheet of the sandwich structure 20 may be of the magnitude of 100 nm. In that case, this means that if the sandwich structure 20 is 3 mm thick, it comprises about 30 electrochemically active sheets.

The electrochemical sheets in the sandwich structure 20 may be arranged as rolled up cylindrical cells, or as several sheets piled together in order to form a pouch cell structure. In the case of a cylindrical form, the electrochemical cells 13 can be arranged as separate cylinders, or as several cylinders connected in series, together forming a longer cylinder. In this way, cylindrical cells may be arranged together, forming a longer cylinder, while pouch cells may be arranged together forming blocks of customized shapes, for example rectangular as shown in FIG. 2.

According to a first example, the first state corresponds to a charged state and the second state corresponds to a discharged state. More in detail, the gas generator 8 is armed by charging its electrochemical cells 13 via the electrical connections 10, 11 to a designated state of charge (SOC) which corresponds to a gasification rate and properties to be achieved in order to optimize the performance of the gas generator 8. The electrical connections 10, 11 are for this purpose connected to the electrochemical cells 13, either in parallel, in series, or in a combination of these. The charging is preferably made after mounting the airbag unit 4 in the vehicle 1 in order to avoid accidents during transport and mounting.

In this way, energy for generation of gas is stored in an electrochemically active material, for example a cathode material may be constituted by cobalt dioxide, which is used in Li-ion cell chemistries denoted as "Generation 1" lithium-ion battery chemistries, and is known to generate gas when being exposed to abusive conditions such as exposure to elevated temperature due to high currents or overcharge:

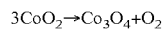

Followed by the decomposition of one of the electrolyte solvents, dimethyl carbonate (DMC):

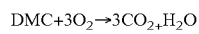

Other examples of electrolyte solvents common in electrochemical Lithium-ion based cells are ethylene carbonate (EC) and diethyl carbonate (DEC). The gaseous products generated when alkyl carbonates such as these solvents decompose with oxygen that is released when the cathode decomposes are $CO_2$, $CO$, $O_2$, $CH_4$, $C_2H_4$, $C_2H_6$, $C_3H_6$ and $C_3H_8$. The reactive environment activated when the gas generator is initiated will further combust the hydrocarbons generating a final gas composition of mostly $CO_2$.

Other electrochemical active materials may also be used, e.g. manganese spinel ($Mn_2O_4$) or titanates (TiO).

When the gas generator 8 is activated, the electrical connections 10, 11 are short circuited such that the stored electrical energy is discharged, which leads to that gas is generated by means of chemical reactions which decomposes the active material.

This type of chargeable gas generator 8 can be continuously monitored, via its electrical properties, so as to assure its present operational state and explosive force. The latter will help to optimize the rate of gas generation in relation to the aging of the gas generator 8 or its individual components, e.g. the material of an airbag, through its life time use.

It is also possible to obtain a customized inflation performance and gas distribution due to adaptive chargeability and arrangement of the electrochemical cells 13 in parallel or in series.

At the end of life of the vehicle 1, safe dismantling and handling of the airbag unit 4 with the gas generator 8 is made possible by means of electronic deactivation of the gas generator 8, using a controlled discharge, which controlled discharge preferably is controlled to be a relatively slow discharge.

According to a second example, the first state corresponds to a discharged state, and where the second state corresponds to a charged state. More in detail, the airbag unit 4 is installed in the vehicle 4 and then kept deactivated until a collision or similar occurs. When the gas generator 8 is activated, a charging voltage pulse is placed on the electrical connections 10, 11 such that a decomposition reaction is started inside the electrochemical cells 13, which will generate large quantities of gas. This will allow the gas generator 8 to be completely harmless until it is activated. The charging voltage pulse may be provided by a battery 15 already existing in the vehicle 1, the battery only being schematically indicated in FIG. 1. Such a battery 15 may be in the form of a conventional starting battery 15 or a traction battery 15 such as those found in electric- and electric hybrid vehicles.

The charge and discharge current of a battery is measured in a so-called C-rate. C-rate is defined by the equation:

$$C-\text{rate}[h^{-1}] = \frac{\text{current}[A]}{\text{electrical capacity}[Ah]}$$

The equation above describes the relationship between the current discharged and the time it takes to completely empty or charge the electrical capacity of an electrochemical cell. Hence, a high C-rate implies a high current in relation to the cell's electrical capacity, while a low C-rate implies that a low current flows during charge or discharge.

Conventional electrochemical cells can be divided into two main categories; batteries and capacitors. The design of those cells can in its turn be divided into three main types of designs; prismatic, cylindrical and pouch cells. Prismatic and cylindrical cells usually have metal casings while pouch cells comprise a layered foil as described previously, for example constituted by polymer/aluminum/polymer. Conventional casings are designed to prevent any access of air or humidity to the active materials of the cells throughout the life time of the unit. A plurality of electrochemical cells 13 may either be arranged in the form of a sheet, or in the form of a rolled sheet.

Both batteries and capacitors and other storage devices such as flywheels, as well as all design options, are candidates for being used as electrochemical cells in gas generators according to the present invention, where the materials used will provide the desired properties and gas generating capabilities. The gas generator in FIG. 2 is only a schematical illustration of electrochemical cells 13 in an electrochemical gas generator, while all types of electrochemical cell shapes, designs, functionality and configurations are conceivable. The gas generator according to the present invention should comprise at least one electrochemical cell.

It is desired that the electrochemical cells 13 are safe and stable in their uncharged state, but can be provoked to rapidly generate gas when being subject to a predefined state-changing action, such that a state-changing condition exists during the change to the second state; for example a high C-rate current shock such as the described discharge and charge processes, heat exposure or mechanical puncturing, for example by means of crush or nail penetration.

In order to achieve this, such electrochemical active materials are used that establish an electrochemical cell environment capable of activating its decomposition reactions when being subject to a predefined state-changing action, as mentioned above. For an example, the electrolyte components and the active materials of the electrodes should be chosen so that the ionic transport properties of the electrochemical system will generate massive heat when the state-changing condition exists. The heat generated will activate decomposition reactions such as thermal runaway and consequently gas will be generated. Various additives may be incorporated into the system in order to enhance the properties desired.

The electrochemical cells may be connected in parallel as well as in series. This may be used to customize the performance. For example, a number of electrochemical cells, connected in parallel, may be triggered individually in a certain order such that a desired inflation is generated. This method of optimization will allow weight reduction of products demanding large gas volumes, such as curtain airbags, as will be described below.

In the arrangement according to FIG. 1, the gas generator 8 is rolled and sewed into the upper part of the curtain airbag. The gas generator 8 is composed of several electrochemical cells connected in parallel. The deployment characteristics and the inflation characteristics may be customized by triggering the electrochemical cells individually.

Weight reduction in comparison to conventional curtain airbags may be achieved since the electrochemical cells are evenly distributed across the length of the curtain airbag 6 and the airbag units' ability to generate customized deployment and inflation characteristics.

Figure 4:
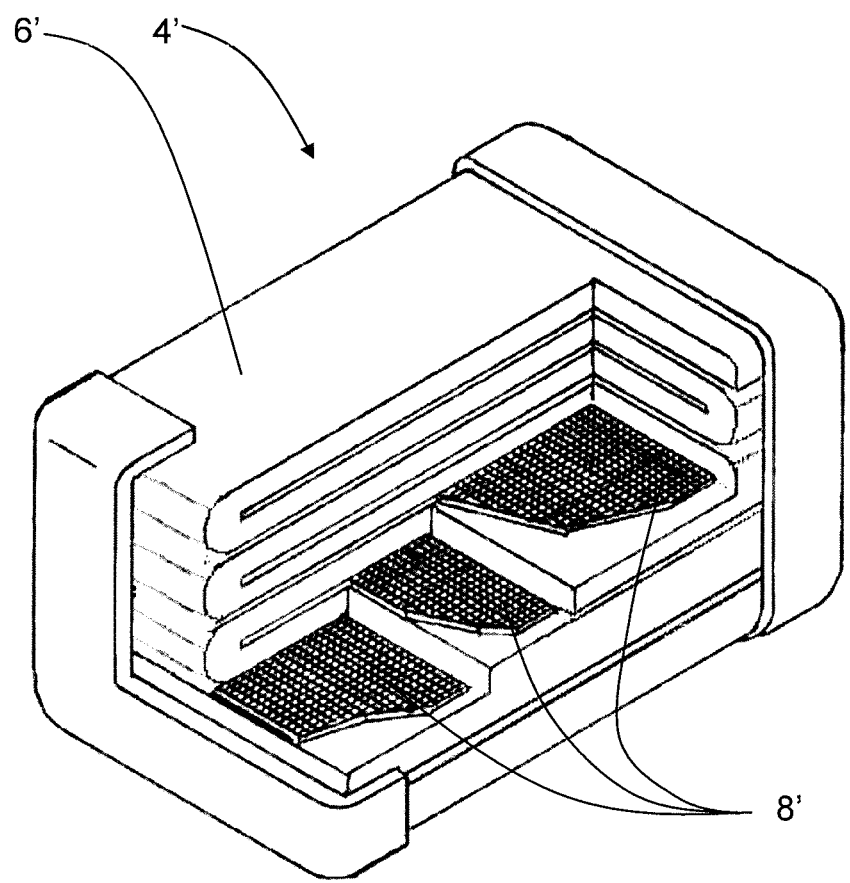
FIG. 4 shows a schematic partially cut-open perspective view of a second type of airbag unit.

With reference to FIG. 4, showing a partially cut-open perspective view of a second type of airbag unit 4', there is an airbag unit 4' comprising a folded airbag 6' and a gas generator 8', where the gas generator 8' comprises sheets of an electrochemically active material analog to the pouch cell mentioned previously. The sheets are integrated into the folded airbag 6' as shown in FIG. 4.

This airbag unit 4' is thus in the form of an electrochemical sandwich structure capable of generating gas when being subject to a predefined state-changing action as discussed above.

Figure 5:
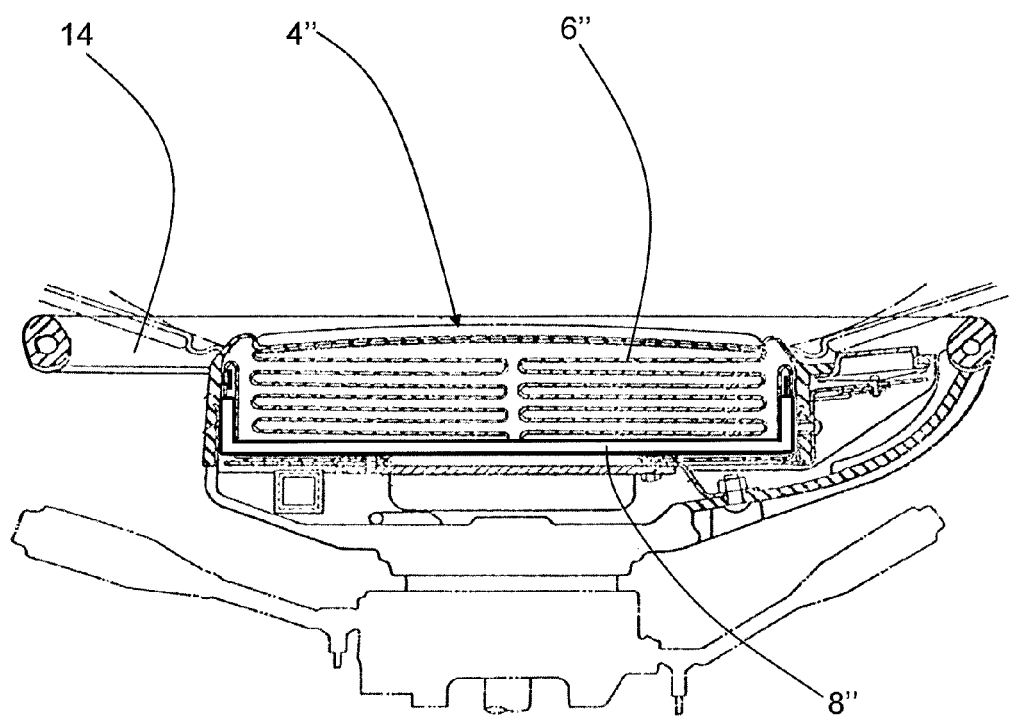
FIG. 5 shows a schematic partially cut-open top view of a steering wheel comprising a third type of airbag unit.

FIG. 5 shows a partially cut-open top view of a steering wheel 14 comprising a third type of airbag unit 4". In this example, the gas generator 8" may be constituted by a prismatic cell or a pouch cell. The flat design allows for a smaller and light airbag 6". Moreover, the design is not restricted to a flat surface. Instead it can be installed so as to follow the curvature of the airbag housing.

Figure 6:
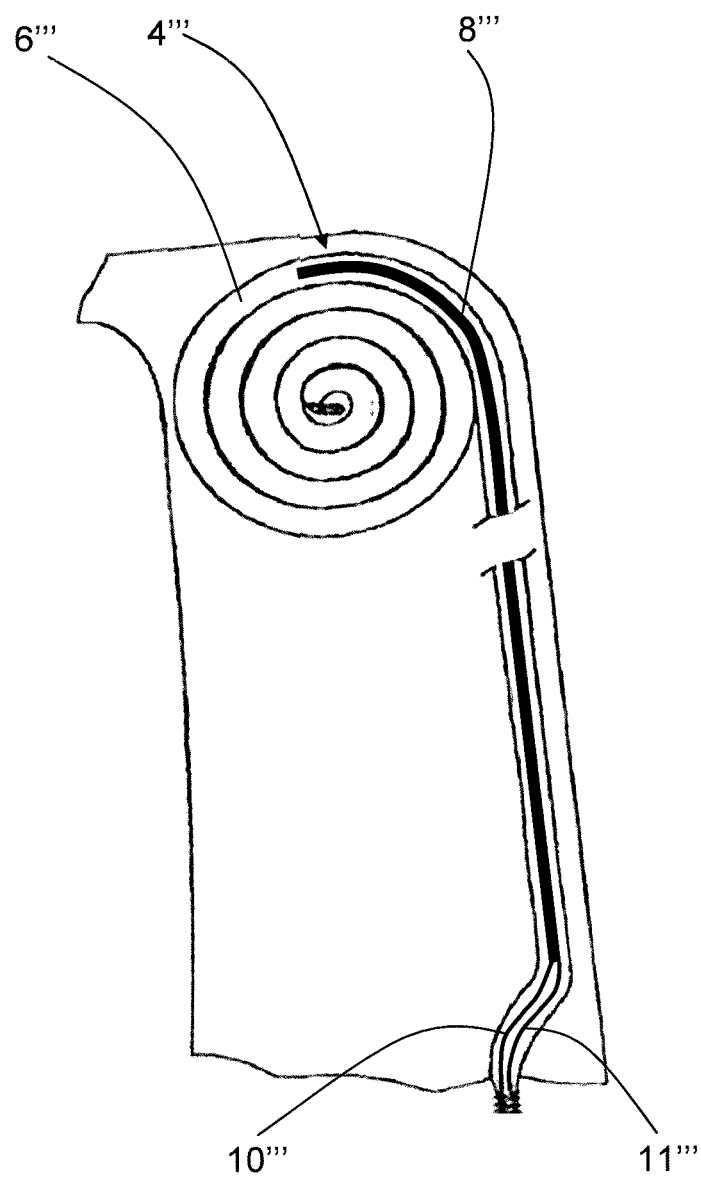
FIG. 6 shows a schematic cut-open top side view of a curtain airbag.

With reference to FIG. 6, there is an airbag unit 4''' comprising a curtain airbag 6'''. In this setup, the gas generator 8''' is mounted as a sheet and integrated into the upper part of the curtain airbag 6'''. The gas generator 8''' is here constituted by a single roll of flat electrochemical cells, either connected in parallel or in series. The deployment and the inflation characteristics may be customized by triggering the electrochemical cells individually. The electrical connections 10''', 11''' are also indicated in FIG. 6.

Weight reduction, in comparison with conventional curtain airbags, is achieved when using a gas generator 8''' comprising electrochemical cells which are evenly distributed across the length of the curtain airbag 6''', as previously shown in FIG. 1. The airbag unit's ability to generate customized deployment and inflation characteristics also contributes.

Generally, for all examples above, depending on which kind of triggering that is used, unintended triggering can be avoided by deactivating the gas generator 8 electronically. A charged gas generator 8 shall be capable of being discharged without deployment using relatively slow discharge. Hence, not only the safety in the handling process is improved, but also enables the possibility for recycling.

The gas generator design is not restricted to cylindrical shapes, but may for example have cylindrical, block or sheet shape. The geometries of a gas generator allow it to be stretched along the length of an airbag with a longitudinal extension, for example as illustrated in FIG. 1. Hence, an evenly distributed inflation can be achieved using a lower weight and gas volume generating inflator device.

Since the present operational status of a gas generator can be continuously monitored throughout its lifetime, unreliable gas generator performance can be avoided.

The present invention also relates to a method for activating a gas generator 8, 8', 8'', 8''', 8'''' upon fulfillment of at least one predetermined criterion such that gas is released by the gas generator 8, 8', 8'', 8''', 8'''' into a reservoir 6, 6', 6'', 6''' and the pressure in the reservoir 6, 6', 6'', 6''' is increased. The method comprises the step of changing the electrical status of at least one electrochemical cell 13 used by the gas generator 8, 8', 8'', 8''', 8'''' from a first state to a second state by means of a state-changing action.

The present invention is not limited to the examples above, but may vary freely within the scope of the appended claims. For example, a gas generator's electrochemical cells may be connected both in series and in parallel, or in a combination thereof.

By means of the electrical connections 10, 11, an electric deployment may be controlled, either by means of a charge pulse or a discharge pulse in the form of a short circuit. The short circuit may be any type of connection of the electrical connections 10, 11, where the resistance between the electrical connections 10, 11 may be controlled in order to control the deployment. In the same way, the charge pulse may also be controlled in order to control the deployment. In this way a desired airbag deployment may be obtained. Generally, there need not be a certain discharge pulse, but any type of discharge that results in gas release. Such a discharge may be in the form of a controlled, at least partial, short-circuit.

As mentioned above, the electrical status of said electrochemical cell is changed from a first state to a second state. This may be achieved in many ways, and generally, the change to the second state is incurred by some type of state-changing action such that a state-changing condition exists during the change to the second state.

Figure 7:
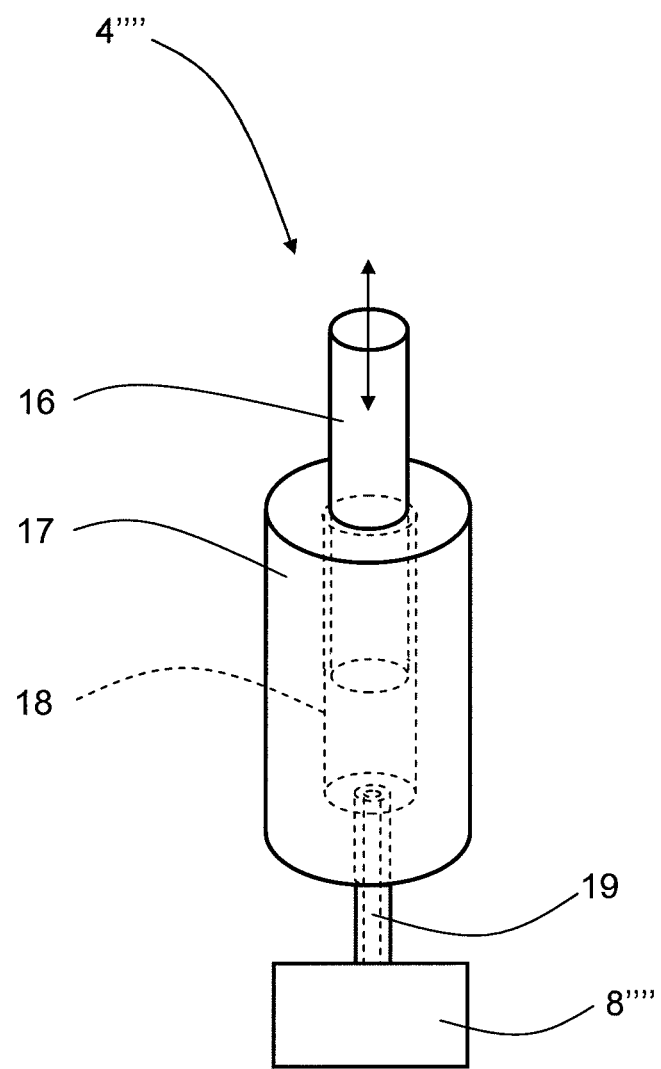
FIG. 7 shows a schematic perspective view of a piston with a cylinder connected to a gas generator.

The present invention generally relates to a personal protection arrangement in a vehicle. The gas generator of the present invention may thus be arranged for filling other reservoirs with gas than airbags. For example, with reference to FIG. 7, a personal protection arrangement 4'''' may be constituted by a seat belt pre-tension device or a hood-lifting device conceivable, where for example a hood-lifting device may comprise a piston 16 which is movable in a corresponding bore 18 in a cylinder 17, where the cylinder bore 18 constitutes a reservoir which a gas generator 8'''' is arranged to fill with gas via a suitable conduit 19. A similar arrangement may be used for a seat belt pre-tension device.

The gas generator of the present invention may thus be arranged for protection arrangements intended for persons travelling in a vehicle as well as persons outside a vehicle, such as pedestrians and bicyclists.

The different ways of activating an electrochemical gas generator according to the above are applicable for all types of electrochemical gas generators mentioned above, and for all other types that are conceivable for use in a vehicle airbag unit.

The terms charged and discharged should be interpreted as relative terms, where discharged electrochemical cells contain less electrical charge than charged electrochemical cells. In other words, in this context, charged electrochemical cells do not have to be charged to maximum charging capacity, and discharged electrochemical cells do not have to be completely discharged. As mentioned preciously, the short circuit is at least partial, which means that the current may be conducted via a resistance which may be adjustable during the state-changing action in this case.

The collision detector 9 may comprise either an in-crash sensor or a pre-crash sensor.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A personal protection arrangement in a vehicle, the personal protection arrangement comprising:
   a gas generator for fluid communication with a reservoir of the personal protection arrangement; and
   a control unit arranged to activate the gas generator upon fulfillment of at least one predetermined criterion selected from a crash or impending crash such that a gas is released by the gas generator into the reservoir and the pressure in the reservoir is increased;
   wherein the gas generator includes at least one electrochemical cell, the at least one electrochemical cell arranged to generate the gas when an electrical status of the at least one electrochemical cell is changed from a charged state in which energy for generation of the gas is stored in an electrochemically active material of the at least one electrochemical cell to a discharged state in which the energy for generation of gas is dissipated to generate the gas through chemical reactions which decompose the electrochemically active material by a state-changing action, the at least one electrochemical cell having a lesser electrical charge in the discharged state than in the charged state.

2. The personal protection arrangement according to claim 1, wherein the gas generator is arranged to be deactivated electronically by a controlled discharge.

3. The personal protection arrangement according to claim 1, further comprising an airbag unit and wherein the reservoir is constituted by at least one airbag.

4. The personal protection arrangement according to claim 1, further comprising a pressure chamber and a piston.

5. The personal protection arrangement according to claim 4, wherein the personal protection arrangement is one of a seat belt pre-tension device and a vehicle hood lifter.

6. The personal protection arrangement according to claim 1, wherein each electrochemical cell includes a compound with ionic transport properties that generate a heat gas and the gas when submitted to the state-changing action.

7. The personal protection arrangement according to claim 1, wherein the at least one electrochemical cell includes a plurality of electrochemical cells either arranged in a form selected from a group consisting of a sheet and a rolled sheet.

8. The personal protection arrangement according to claim 1, wherein the control unit is connected to receive input from a collision detector, where the collision detector comprises one of an in-crash sensor and a pre-crash sensor.

9. The personal protection arrangement according to claim 1, wherein the state-changing action is an exposure to an elevated temperature.

10. The personal protection arrangement according to claim 1, wherein each electrochemical cell includes a positive active ingredient, a negative active ingredient and a separator filled with electrolyte.

11. The personal protection arrangement according to claim 1, wherein the at least one electrochemical cell includes a plurality of electrochemically active sheets.

12. The personal protection arrangement according to claim 1, wherein the gas generator is armed by charging the at least one electrochemical cell with a pair of electrical connections.

13. The personal protection arrangement according to claim 1, wherein the at least one electrochemical cell stores energy for generation of gas in an electrochemically active material.

14. The personal protection arrangement according to claim 1, wherein the personal protection device includes an inflatable airbag and the at least one electrochemical cell is integrated into the inflatable airbag.

15. A personal protection arrangement in a vehicle comprising:
an airbag for protecting a passenger of the vehicle; and
a device in communication with the airbag for creating gas to inflate the airbag, the device including at least one electrochemical cell for providing inflation gas for the airbag, the at least one electrochemical cell arranged to generate gas when the electrical status of the at least one electrochemical cell is changed from a first state to a second state by a state-changing action;
wherein the first state is a charged state and the second state is a discharged state, and wherein the state-changing action is constituted by a discharge of the at least one electrochemical cell to produce the inflation gas such that the at least electrochemical cell has a lesser electrical charge in the discharged state as compared to the charged state.

16. The personal protection device of claim 15, further comprising a control unit for activating the at least one electrochemical cell to generate gas and inflate the airbag.

17. The personal protection device of claim 15, wherein the at least one electrochemical cell is changed from the first state to the second state in response to a sensed vehicle condition selected from a group consisting of a pre-crash event and an in-crash event, and
wherein the sensed vehicle condition triggers the gas generator to inflate the reservoir with the gas generated by activation of the at least one electrochemical cell.

18. The personal protection device of claim 15, wherein the at least one electrochemical cell is integrated into the inflatable airbag.

* * * * *